(12) United States Patent
Bedu-Amissah et al.

(10) Patent No.: US 10,384,183 B2
(45) Date of Patent: Aug. 20, 2019

(54) STEAM METHANE REFORMER TUBE OUTLET ASSEMBLY

(71) Applicants: Kwamina Bedu-Amissah, Humble, TX (US); Troy M Raybold, Colden, NY (US); Bobby L Ranson, La Porte, TX (US)

(72) Inventors: Kwamina Bedu-Amissah, Humble, TX (US); Troy M Raybold, Colden, NY (US); Bobby L Ranson, La Porte, TX (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 123 days.

(21) Appl. No.: 15/433,340

(22) Filed: Feb. 15, 2017

(65) Prior Publication Data

US 2018/0229200 A1    Aug. 16, 2018

(51) Int. Cl.
*B01J 8/06*  (2006.01)
*C01B 3/38*  (2006.01)

(52) U.S. Cl.
CPC .............. *B01J 8/06* (2013.01); *B01J 8/062* (2013.01); *B01J 8/067* (2013.01); *C01B 3/38* (2013.01); *B01J 2208/00495* (2013.01); *B01J 2208/06* (2013.01); *B01J 2208/065* (2013.01); *B01J 2219/00155* (2013.01); *C01B 2203/0233* (2013.01); *C01B 2203/0238* (2013.01); *C01B 2203/1614* (2013.01)

(58) Field of Classification Search
CPC .................... B01J 8/06; B01J 8/067
See application file for complete search history.

(56) References Cited

U.S. PATENT DOCUMENTS

| 4,127,389 | A | * | 11/1978 | Hackemesser .......... C01B 3/384 422/201 |
| 5,254,318 | A | | 10/1993 | Williams et al. |
| 5,490,974 | A | | 2/1996 | Hohmann et al. |
| 5,935,517 | A | | 8/1999 | Roll et al. |
| 6,099,922 | A | | 8/2000 | Boll et al. |
| 6,139,649 | A | | 10/2000 | Wynns |
| 6,623,869 | B1 | | 9/2003 | Nishiyama et al. |

(Continued)

FOREIGN PATENT DOCUMENTS

WO    2014023622 A2    2/2014

OTHER PUBLICATIONS

Asia Industrial Gases Association et al.; Treatise on Process Metallurgy, vol. 3, Mechanical Integrity of Syngas Outlet Systems; AIGA 095/16; Dec. 13, 2013 (Dec. 13, 2013)' XP055471321; ISBN: 978-0-08-096988-6; Retrieved from the Internet: URL:http://www.asiaiga.org/uploaded_docs/AIGA%20095_16%20Mechanical%20Integrity%20of%20Syngas%20outlet%20systems.pdf: [retrieved on Oct. 16, 2016]; p. 8; figure 5; pp. 1-24.

(Continued)

*Primary Examiner* — Matthew J Merkling
(74) *Attorney, Agent, or Firm* — Iurie A. Schwartz

(57) ABSTRACT

The present invention relates a steam methane reformer tube outlet assembly and a method of assembling or retrofitting same. More specifically, it relates to an exposed flanged tube outlet of a reformer designed to mitigate metal dusting corrosion, dew point condensation-related metal fatigue and cracking, and over-temperature induced metal failures such as hydrogen attack.

10 Claims, 11 Drawing Sheets

Tube outlet with tapered internal insulation can

(56) References Cited

U.S. PATENT DOCUMENTS

| | | | |
|---|---|---|---|
| 6,737,175 B2 | 5/2004 | Ramanarayanan et al. | |
| 6,796,369 B1 | 9/2004 | Dimartino, Sr. | |
| 7,037,485 B1 | 5/2006 | Drnevich et al. | |
| 7,220,494 B2 | 5/2007 | Lundberg et al. | |
| 7,422,804 B2 | 9/2008 | Chun et al. | |
| 8,029,914 B2 | 10/2011 | Bagnoli et al. | |
| 8,236,252 B2 * | 8/2012 | Meissner | B01J 8/008 261/16 |
| 8,776,344 B2 | 7/2014 | Garland et al. | |
| 2004/0037760 A1 * | 2/2004 | Fell | B01J 8/008 422/198 |
| 2005/0051299 A1 * | 3/2005 | Graham | F28F 9/0239 165/82 |
| 2007/0104974 A1 | 5/2007 | Natesan et al. | |
| 2013/0209318 A1 | 8/2013 | Garland et al. | |

OTHER PUBLICATIONS

Hans Dziurdza: Furnace Technology Meet Steam Reformers; SELAS-LINDE GmbH, Apr. 23, 2013 (Apr. 23, 2013), pp. 1-95, XP055471350, Retrieved from the Internet: URL:https://www.scribd.com/document/234219409/Steam-Reformers, [retrieved on Apr. 27, 2018], p. 47, figures 1, 2.

Thyssenkrupp Industrial Solutions: Improving Reformer Pigtail Reliability, Reformer Outlet Pigtails 33 Nitrogen+Syngas 330, Jul.-Aug. 2014, Jul. 1, 2014 (Jul. 1, 2014), pp. 0-350, XP055471346, Retrieved from the Internet: URL:http://www.questintegrity.com/assets/PDFs/Articles-2014/Improving-reformer-pigtail-reliability_Nitrogen+Syngas2014.pdf [retrieved on Apr. 27, 2018], pp. 34-42.

* cited by examiner

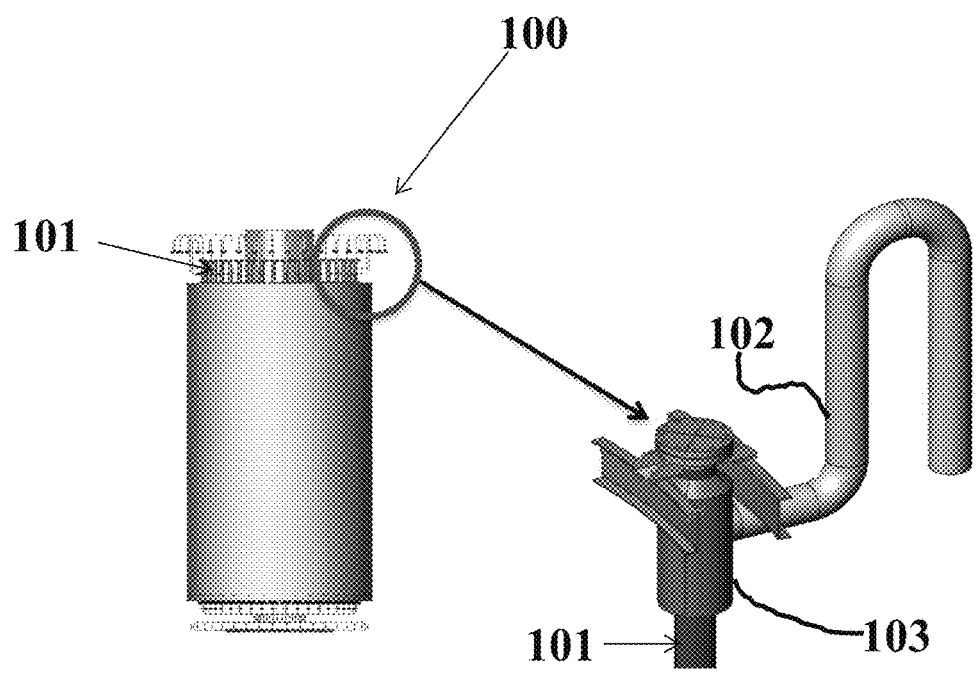
Tube Outlet Assembly
Figure 1: Flanged tube outlet assembly of a bottom-fired, co-current process gas flow cylindrical reformer

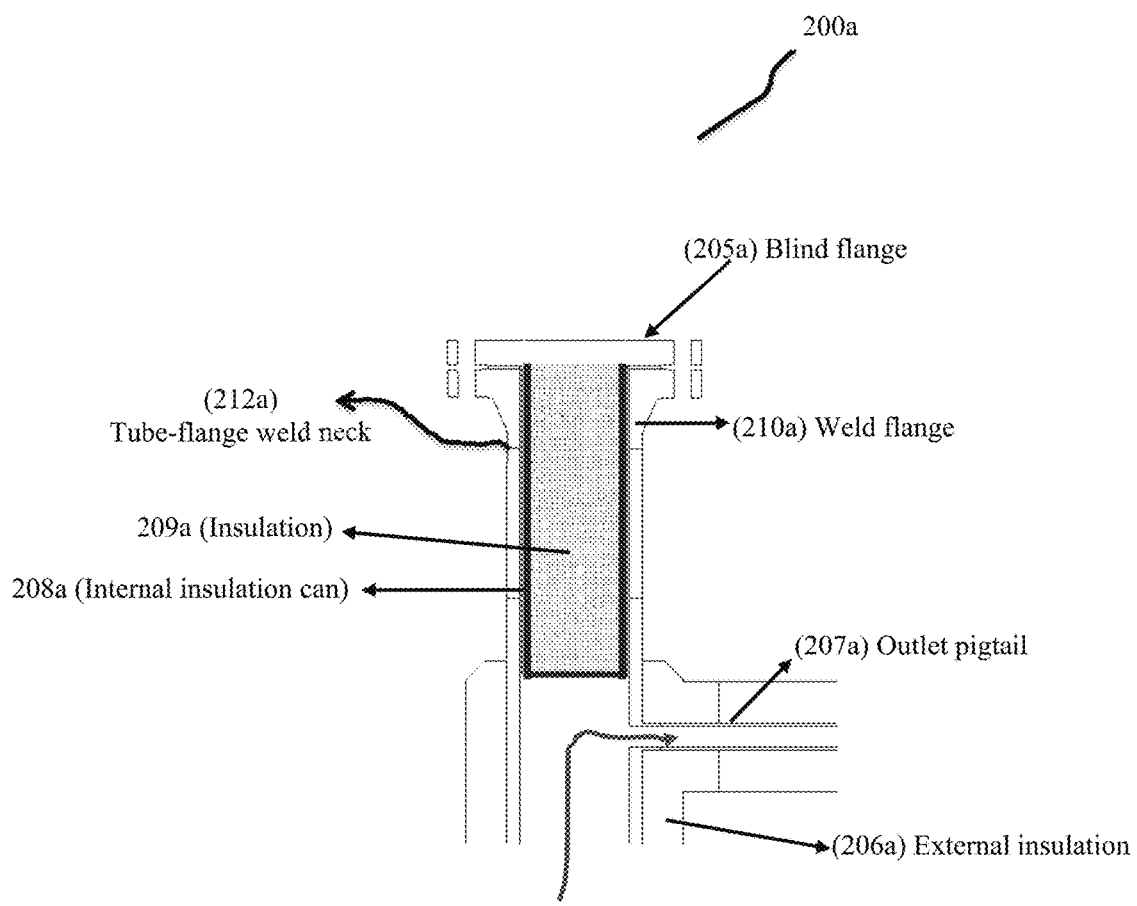
Figure 2a: Tube outlet with poor internal and external insulation design (related art)

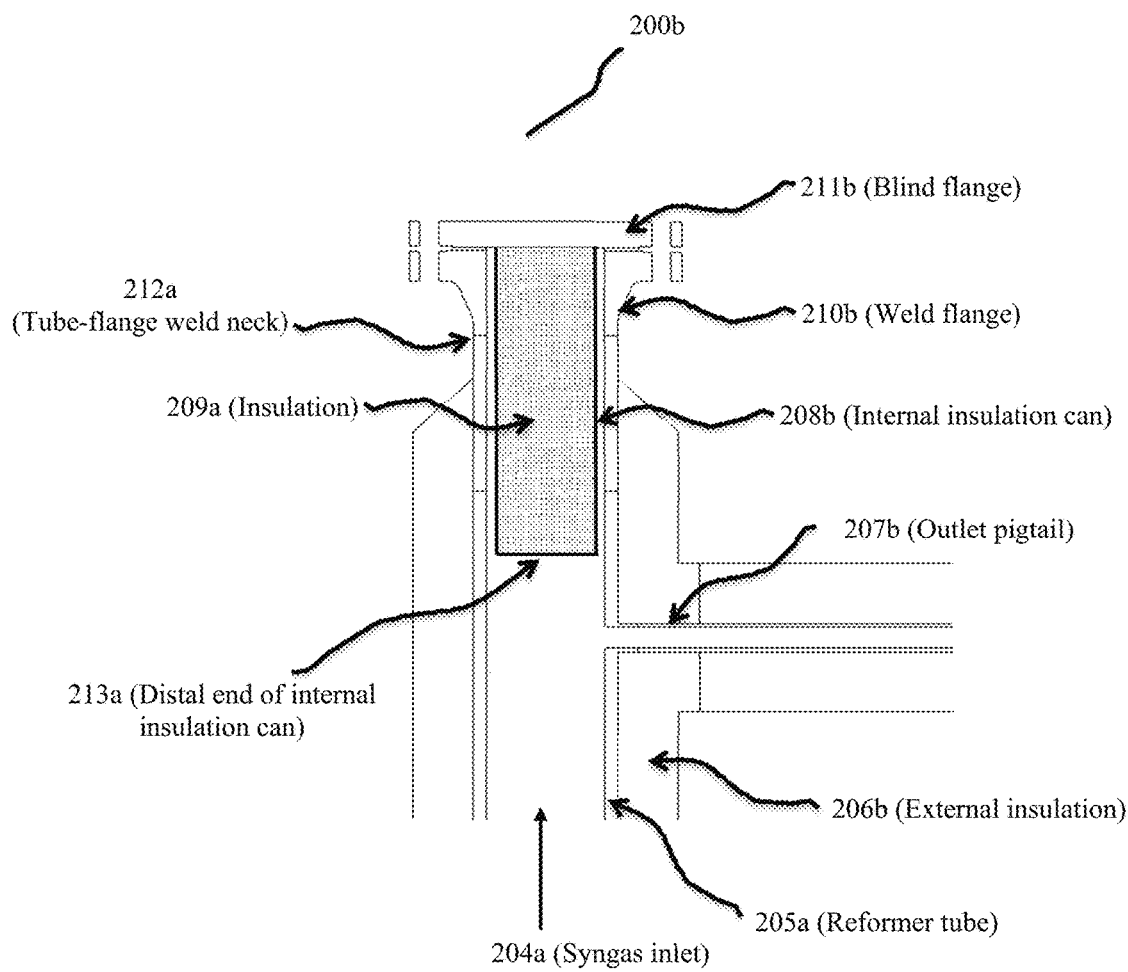
Figure 2b: Tube outlet with poor internal and external insulation design (related art)

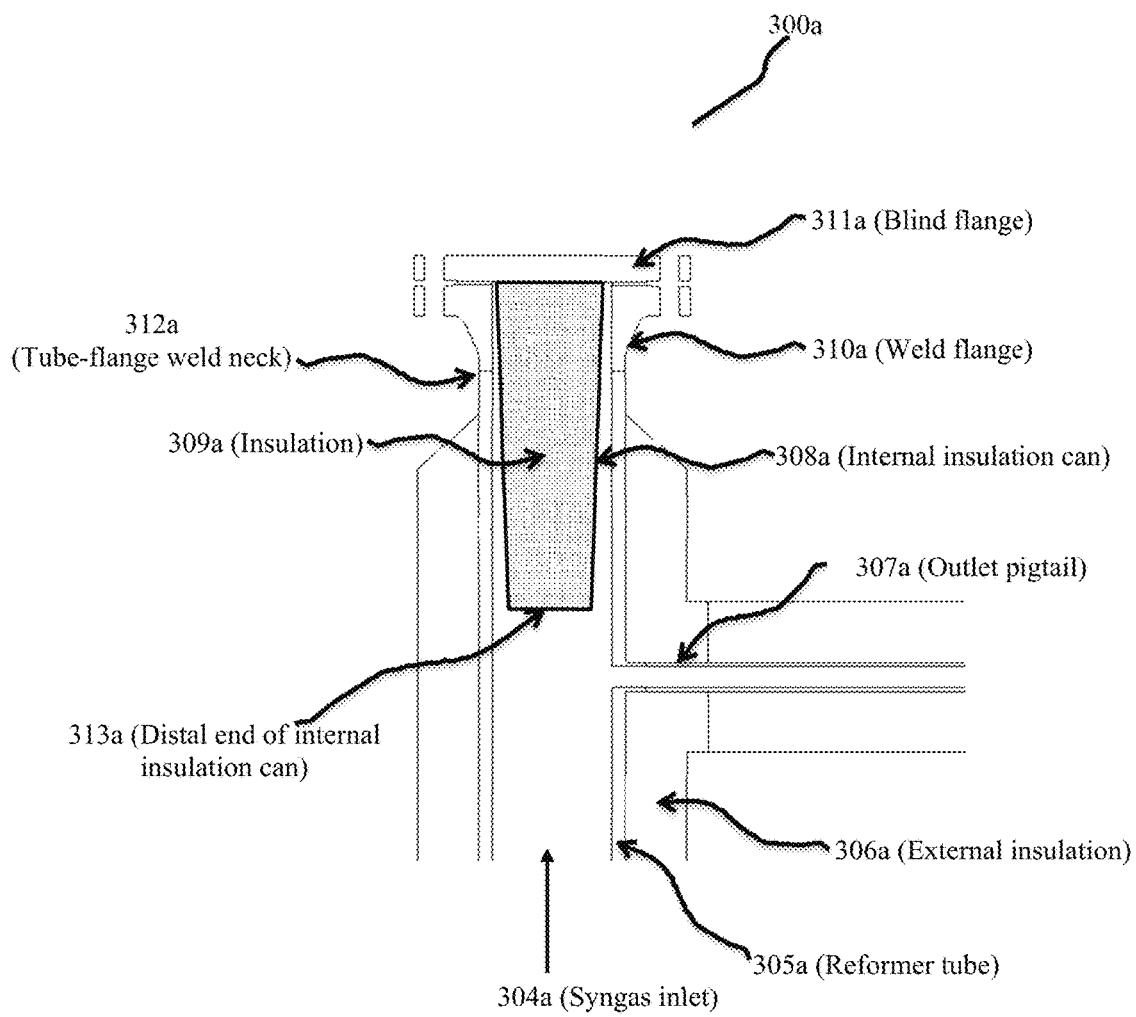
Figure 3a: Tube outlet with tapered internal insulation can

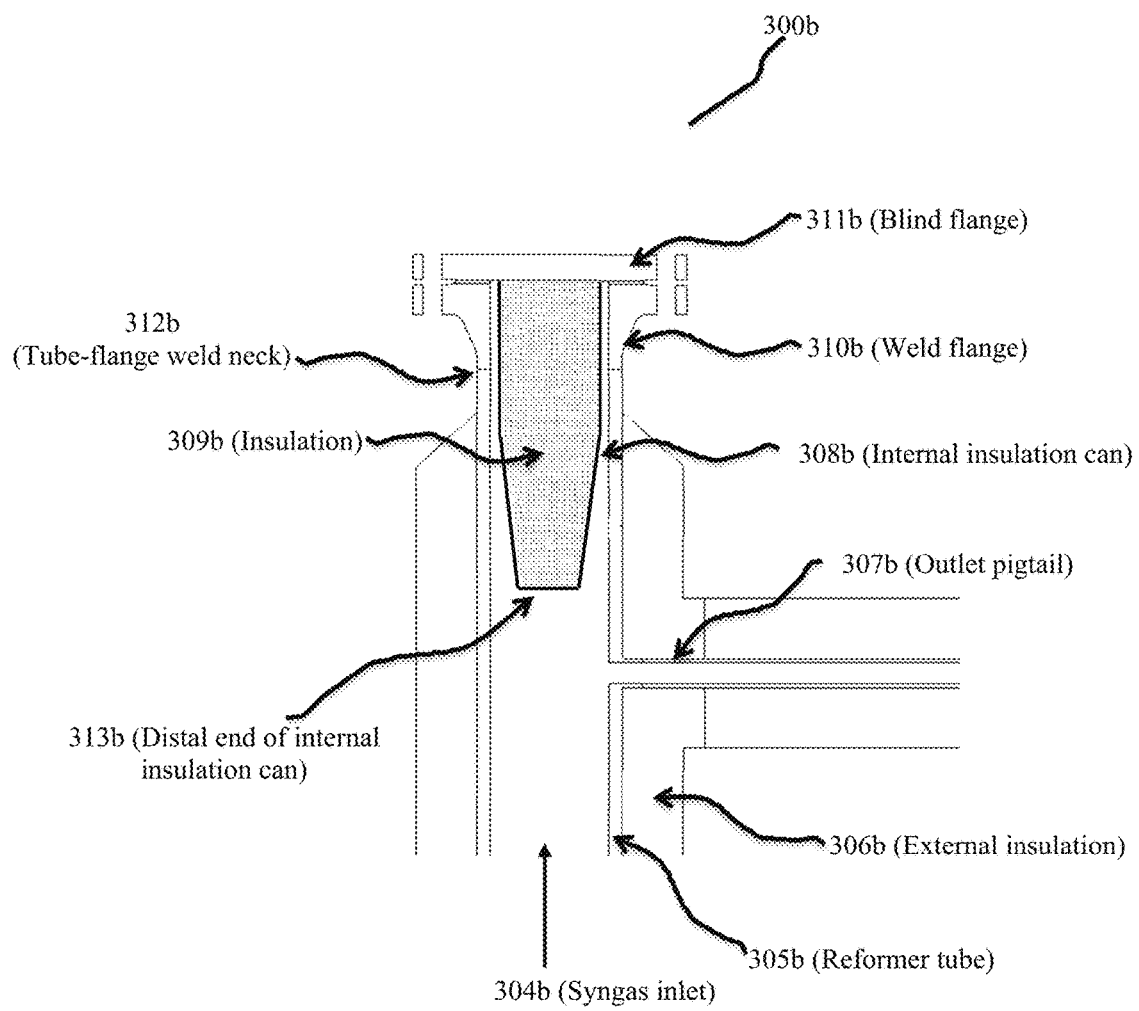
Figure 3b: Tube outlet with partially tapered internal insulation can

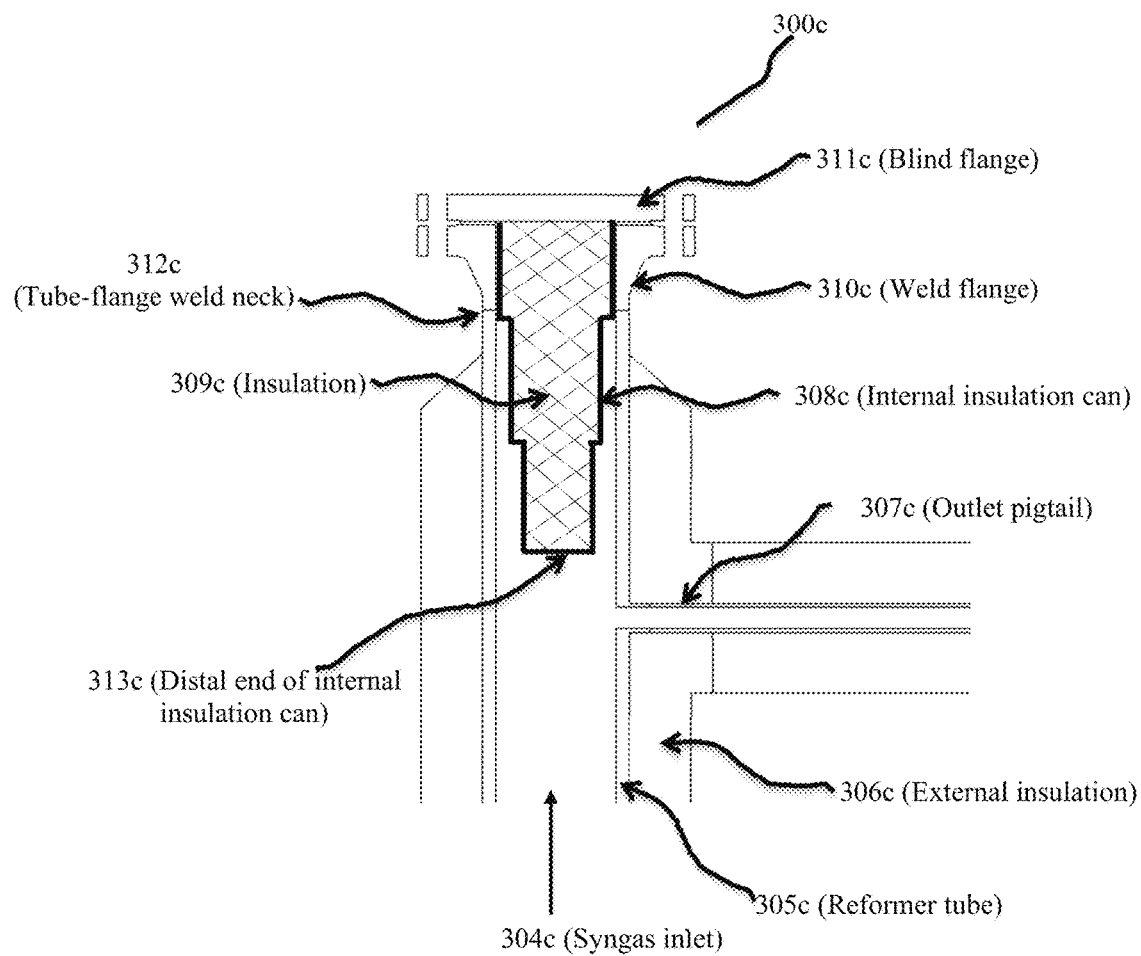
Figure 3c: Tube outlet with continuously stepped internal insulation can

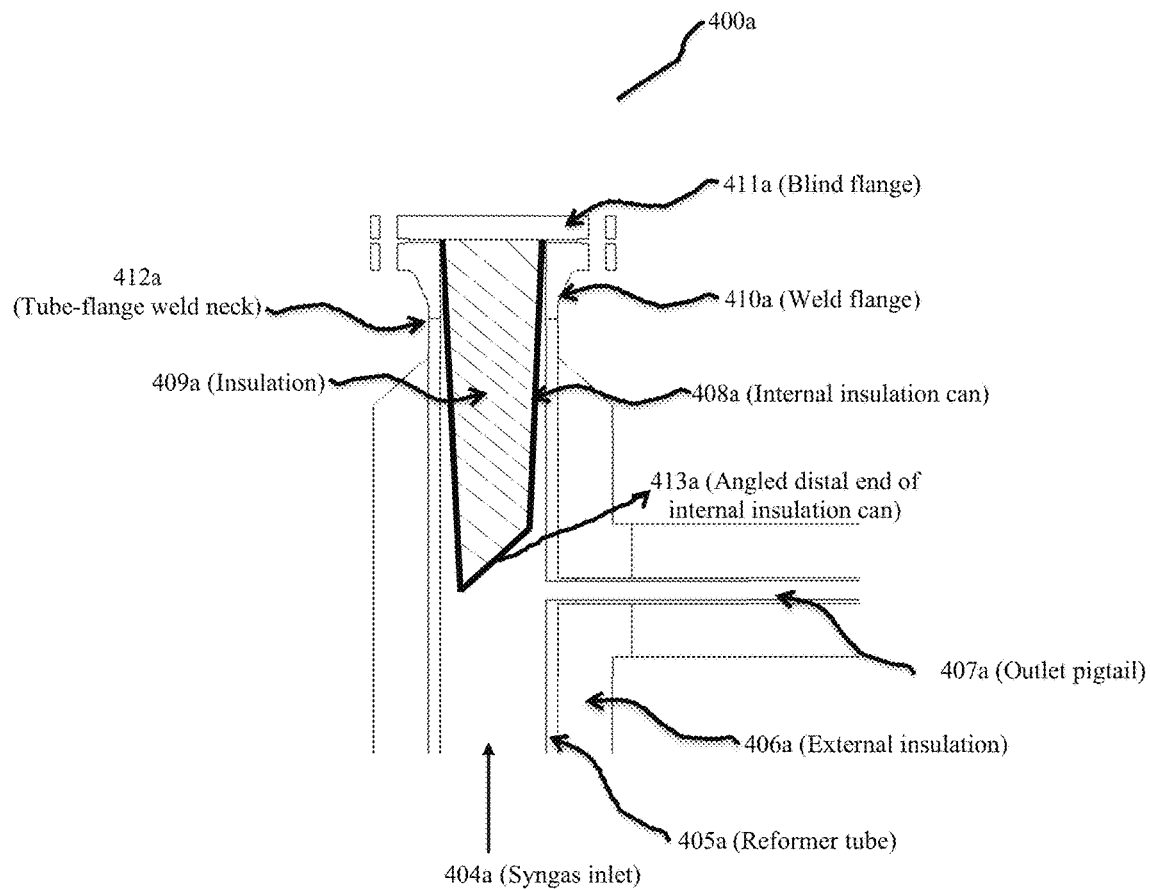
Figure 4a: Tube outlet with tapered internal insulation can

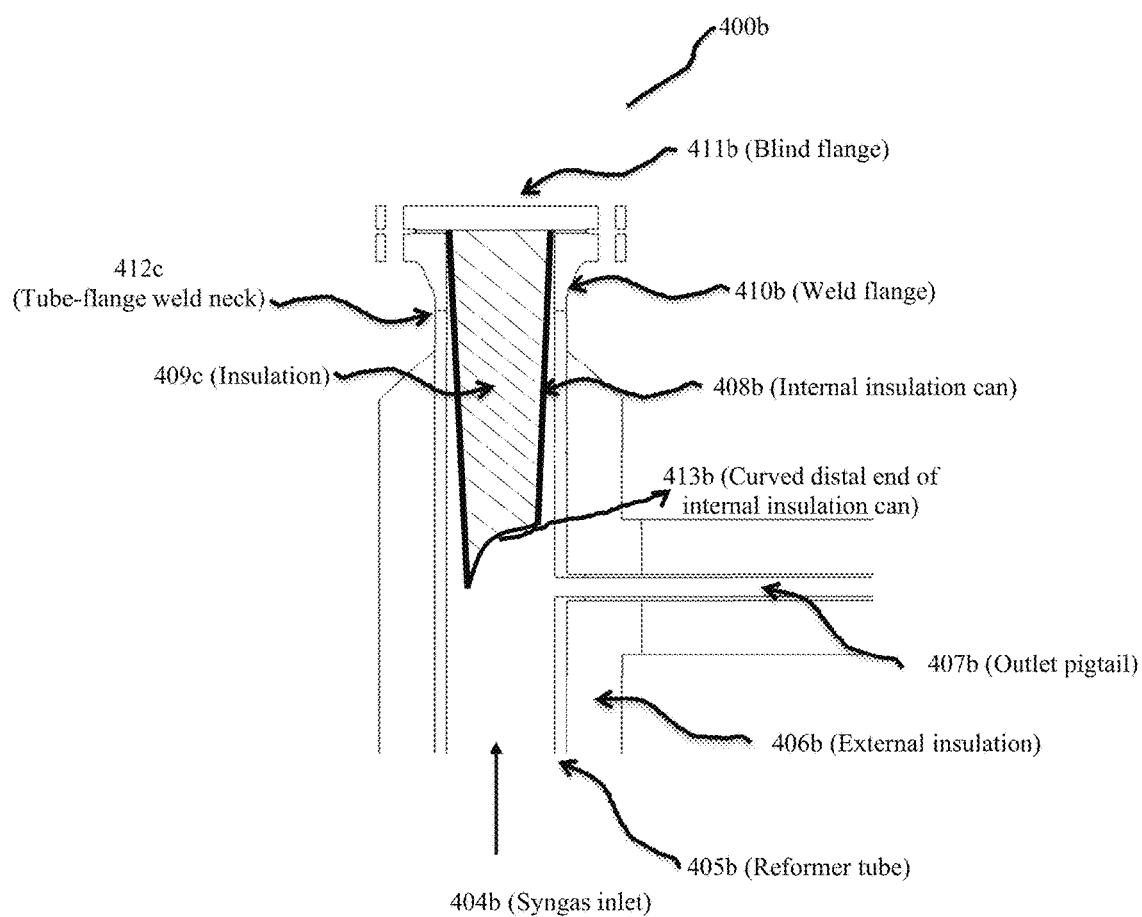
Figure 4b: Tube outlet with tapered internal insulation can

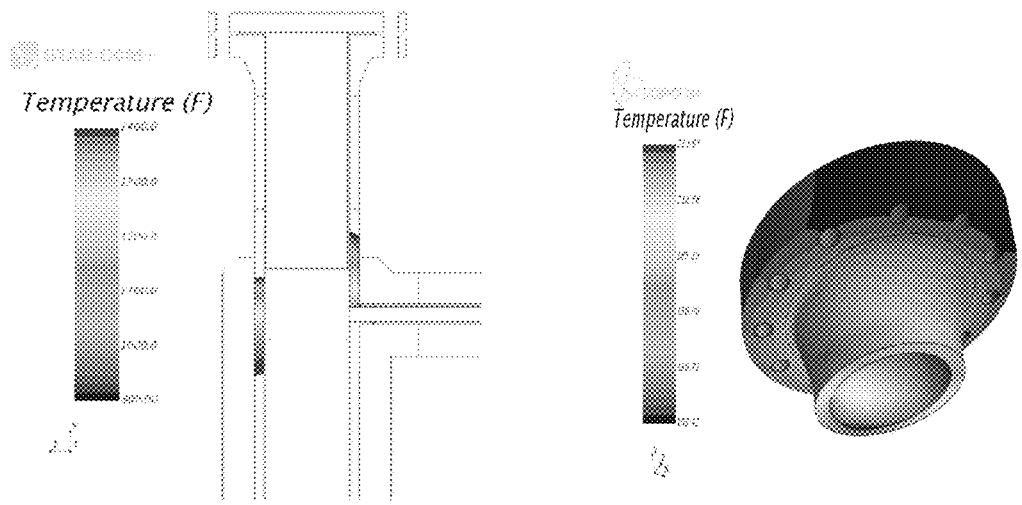
Figure 5a: CFD results of tube outlet showing flange temperatures and regions susceptible to metal dust corrosion
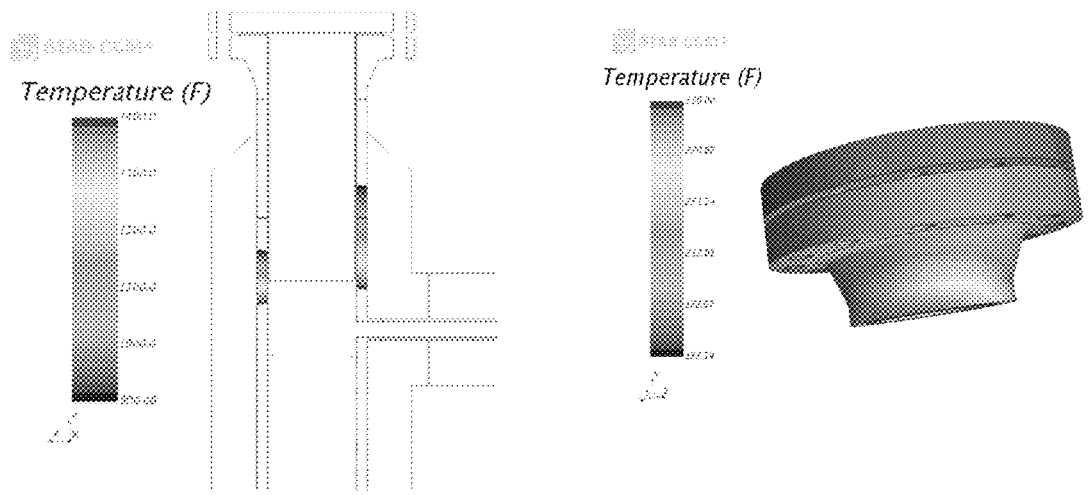
Figure 5b: CFD results of tube outlet showing flange temperatures and regions susceptible to metal dust corrosion

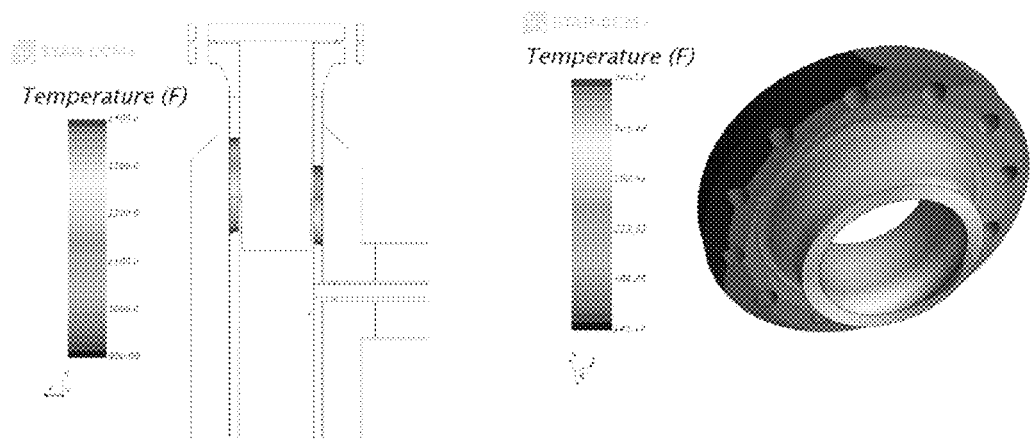
Figure 6: CFD results of tube outlet showing flange temperatures and regions susceptible to metal dust corrosion. The plug is tapered halfway to the top of the can (Fig 3a)
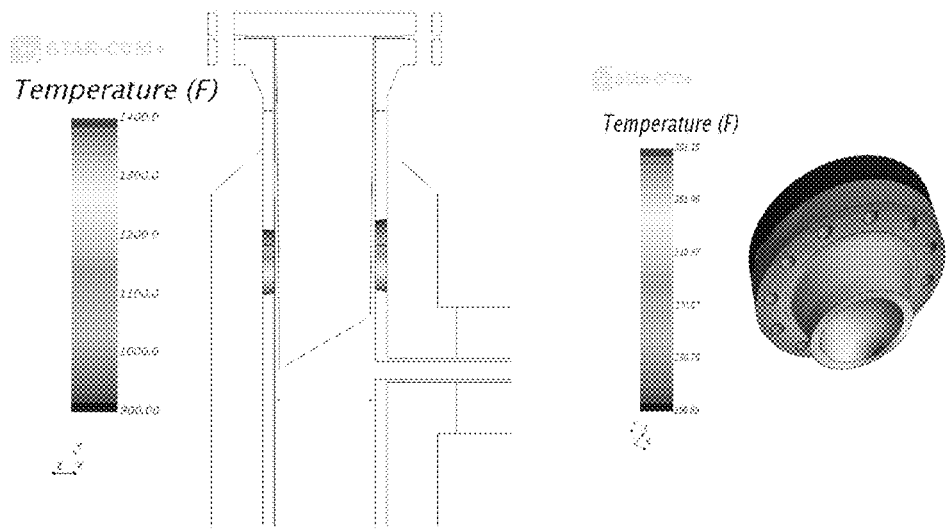
Figure 7: CFD results of tube outlet showing flange temperatures and regions susceptible to metal dust corrosion ((Fig 4a)

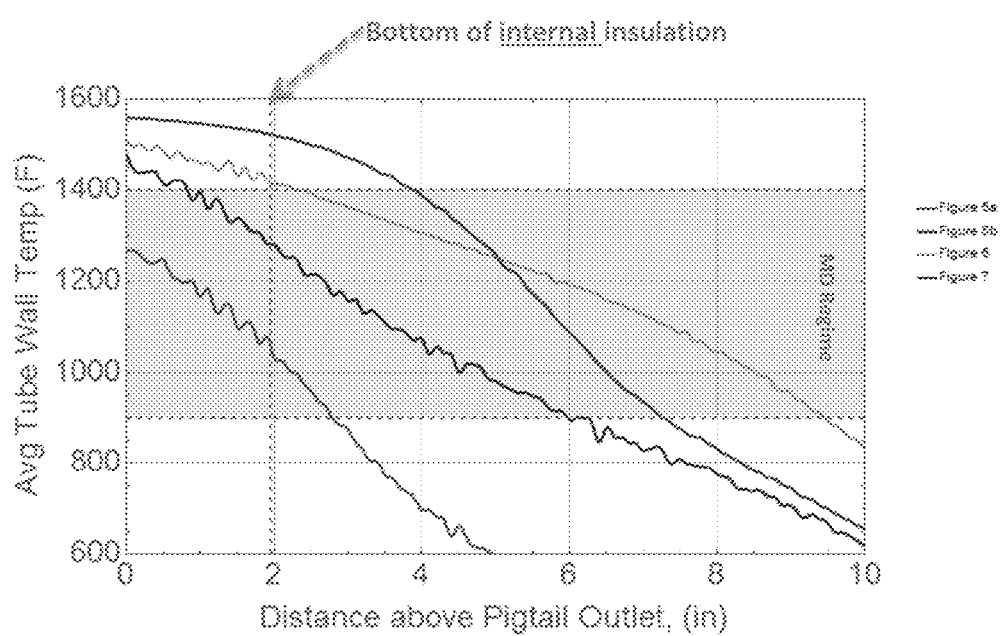
Figure 8: Circumferentially averaged tube outlet inner wall temperature profile starting from outlet pigtail (307a)

STEAM METHANE REFORMER TUBE OUTLET ASSEMBLY

FIELD OF INVENTION

The present invention relates to a flanged tube outlet assembly of a steam methane reformer and a method of assembling or retrofitting same.

BACKGROUND OF THE INVENTION

Steam methane reforming processes are widely used in the industry to make hydrogen and/or carbon monoxide. Typically, in a steam reforming process a fossil-fuel hydrocarbon containing feed such as natural gas, steam and an optional recycle stream such as carbon dioxide, are fed into catalyst-filled tubes where they undergo a sequence of net endothermic reactions. The catalyst-filled tubes are located in the radiant section of the steam methane reformer. Since the reforming reaction is endothermic, heat is supplied to the tubes to support the reactions by burners firing into this radiant section of the steam methane reformer. Fuel for the burners mainly comes from by-product sources such as purge gas from pressure swing adsorption (PSA), and some make-up natural gas. The following reactions take place inside the catalyst packed tubes:

$$CH_4 + H_2O \Leftrightarrow CO + 3H_2$$

$$CH_4 + CO_2 \Leftrightarrow 2CO + 2H_2$$

$$CO + H_2O \Leftrightarrow CO_2 + H_2$$

The crude synthesis gas product (i.e., syngas) from the reformer, which contains mainly hydrogen, carbon monoxide, and water, is further processed in downstream unit operations. An example of steam methane reformer operation is disclosed in Drnevich et al (U.S. Pat. No. 7,037,485), and incorporated by reference in its entirety.

Syngas exiting the steam methane reformer is at high temperature, typically between 1450-1650° F., depending on the plant rate and product slate. Outside the heated zone of the reformer, syngas from the individual tubes is collected and sent downstream for further processing in the aforementioned unit operations. In reformers where the tube outlets are not encased in refractory or placed in refractory lined enclosures, the exposed flanged tube outlet is typically fitted with both internal and external insulation. The design of the tube outlet assembly insulation is critical to preventing premature tube failure as insufficient insulation can lead to temperatures favorable for metal dusting in some areas of the tube outlet, and dew point condensation-related failures in other sections. On the other hand, too much insulation can result in high temperatures at the flanges and eventual weakening or decarburization. The external insulation comprises a high temperature fibrous insulation blanket wrapped around the tube outlet. The internal insulation is sheet metal formed into a shape, hereinafter referred to as a can, and filled with high temperature fibrous insulation material. One end of the can is securely attached to a blind flange such as by welding, and the other end is sealed to enclose the insulation material. The can is positioned inside the reformer tube with a clearance or gap, which as utilized herein refers to the spacing between the outside surface of the can and the inner wall of the reformer tube.

Garland et al (U.S. Pat. No. 8,776,344 B2) disclose a cylindrical can with an angled base, and a 'seal' for use in the inlet of a reformer tube assembly. In a reforming furnace, hot feed gas (typically <1300° F.) is delivered into the individual reformer tubes. In tube assemblies where the inlet port enters from the side, it has been discovered that the hot process gas swirls on entering the tube and some gas can flow upwards toward the flanges, causing them to overheat. This is detrimental to the lifespan and performance of the reformer tubes. The cylindrical, angled base plug disclosed in this patent is positioned adjacent to the inlet port to direct the fluid introduced through said inlet port away from the flanges. The seal placed in the gap limits passage of hot fluid upwards along the gap, thereby preventing overheating of the flanges. However, the invention of the Garland et al disclosure is only applicable to the reformer tube inlet assembly. It aims to reduce flange and weld neck temperatures of the tube inlet. No considerations were given to metal dusting or hydrogen attack of the tube inlets as there is no carbon monoxide (CO) and very little hydrogen ($H_2$) in the process feed gas.

While Hohmann et al (U.S. Pat. No. 5,490,974), Roll et al (U.S. Pat. No. 5,935,517) and Boll et al (U.S. Pat. No. 6,099,922) disclose some methods for preventing metal dust corrosion in outlet pipes and headers containing syngas, the disclosures in these documents concern only outlet pipes and headers that are lined with refractory on the inside. In such cases, carbon monoxide can diffuse through the refractory and come into contact with sections of the metal whose temperatures are in the metal dusting favorable range. This can lead to carburization and catastrophic failure of the material. In the '974 and '517 documents, a hot gas purge is applied to the refractory to arrest syngas diffusion and prevent metal dusting. In the '922 document, the refractory is infused with nickel-based catalyst that promotes reaction of carbon monoxide with the hydrogen and water in the syngas to form $CO_2$, $H_2O$, $H_2$ or $CH_4$, thereby eliminating the potential for metal dust corrosion.

For reformer furnaces in which the tube outlets are exposed to the ambient, the insulation design is critical to preventing a deleterious temperature profile. In the presence of high CO partial pressures, as typically would occur in a reformer tube, areas of the tube inner wall metal surfaces at temperatures between 900-1400° F. are susceptible to high rates of metal dusting. Also, it is important that the wall temperatures stay above the dew point temperature of the syngas to prevent dew point condensation related failures. However, putting too much insulation on the tube outlet to avert the two aforementioned material failure mechanisms will result in high flange temperatures which can lead to decarburization or weakening and cracking of the steel. Premature tube failure can result in extended, unplanned plant shutdown and possible contractual penalties.

Thus, to overcome the disadvantages in the related art, one of the objectives of the present invention is to provide an internal insulation design to the tube outlet assembly that leads to a desired tube metal temperature profile.

It is an object of the invention that the tube outlet assembly insulation ensures that areas of the tube outlet with temperatures favorable to metal dusting occur only in low syngas flow areas in the annular gap between the internal insulation can and reformer tube inner wall in order to greatly minimize the rate of metal dusting corrosion.

It is another object of the invention that the tube outlet assembly insulation reduces the convection of hot syngas to the flanges thereby reducing flange temperatures and preventing high temperature hydrogen attack of the steel flanges.

It is a further object of the invention to prevent dew point condensation related failures by maintaining the entire length of the tube outlet above the syngas dew point temperature.

Other objects and aspects of the present invention will become apparent to one skilled in the art upon review of the specification, drawings and claims appended hereto.

SUMMARY OF THE INVENTION

This invention pertains to the flanged outlet of a steam methane reformer tube assembly. In accordance with one aspect of the invention, a flanged tube outlet assembly of a steam methane reformer assembly is provided. The assembly includes:

- at least one or more reformer tubes having an inlet for allowing the process gas to be introduced into the tube outlet assembly for the removal of the process gas, wherein the process gas exiting an outlet port is syngas,
- the tube outlet assembly is disposed outside the confines of the reformer and includes a reformer tube having an interior space accommodating an internal insulation can therein wherein the insulation can is fitted in the interior space of the reformer tube, and the exterior of the reformer tube is covered with insulation extending in close proximity to the tube-flange weld neck;
- the outlet port disposed upstream of the distal end of the insulating can for delivering the syngas to downstream process units, and
- the insulation can is connected to a blind flange and extends into the reformer tube toward the outlet port, wherein the gap between the can and the interior of the reformer tube is larger at the distal end than at the blind flange end.

In another aspect of the invention, the flanged outlet of a reformer tube outlet assembly is provided. It includes at least one or more reformer tubes having an inlet for allowing the process gas to be introduced into a tube outlet assembly for removal of the process gas, wherein the process exiting the outlet port is syngas.

The tube outlet assembly is disposed outside the confines of the reformer and includes:

- at least one or more reformer tubes having an inlet for allowing the process gas to be introduced into a tube outlet assembly for removal of the process gas, wherein the process exiting an outlet port is syngas,
- the tube outlet assembly is disposed outside the confines of the reformer and includes a reformer tube having an interior space accommodating an internal insulation can therein wherein the insulation can is tapered or stepped in the interior space of the reformer tube and wherein the exterior of the reformer tube is covered with insulation extending in close proximity to the tube-flange weld neck;
- the outlet port is disposed upstream of the distal end of the insulation can for delivering the syngas to downstream process units, and
- the insulation can is connected to a blind flange and extends into the reformer tube toward the outlet port and securely connected to the blind flange, wherein the gap between the can and the interior of the reformer tube is in the range between about 0.1 to 0.5 inches at the blind flange end of the tube outlet, and 0.1 to 1 inches at the distal end, allowing a larger volume of hot syngas to be maintained at the distal end of the gap so the tube metal temperature in the vicinity of the distal end of the can is above metal dusting favorable temperatures, yet regulating the flow of hot gas towards the flange to maintain the whole length of the tube outlet above the syngas dew point temperatures to eliminate condensation/evaporation thermal cycling induced fatigue cracking while lowering the flange temperatures to minimize occurrence over-temperature induced metal failures.

BRIEF DESCRIPTION OF THE DRAWINGS

The above and other aspects, features, and advantages of the present invention will be more apparent from the following drawings, wherein:

FIG. 1 is a schematic representation of a related art bottom-fired cylindrical reformer with tube outlets disposed outside the confines of the reformer;

FIGS. 2a and 2b are a schematic representation of a related art tube outlet assembly;

FIGS. 3a, 3b and 3c are schematic representations of a flanged tube outlet assembly of a reformer tube in accordance with one exemplary embodiment of the invention;

FIGS. 4a and 4b are depictions of another exemplary embodiment of the tube outlet assembly in which the insulation can is tapered and a distal end that is angled or curved;

FIGS. 5a and 5b depict the computational fluid dynamics of a conventional tube outlet assembly;

FIG. 6 depicts the computational fluid dynamics of a tube outlet assembly in accordance with FIG. 3a; and FIG. 7 depicts the computational fluid dynamics of a tube outlet assembly in accordance with FIG. 4a.

FIG. 8 depicts the computational fluid dynamics results showing the improvement in tube outlet reliability against various material degradation mechanisms for the present invention over the related art.

DETAILED DESCRIPTION OF THE INVENTION

The present invention addresses the susceptibility of tube outlets to the aforementioned material degradation mechanisms that lead to premature tube failure in steam methane reformers. Specifically, this invention is utilized with a flanged tube outlet assembly of a steam methane reformer, an example of which is a bottom-fed cylindrical reformer. As utilized herein the term "bottom-fed cylindrical reformer or reactor" will be understood by those skilled in the art to refer to a can reformer or the like where feed gas is introduced into the bottom of the reformer tubes, and the burners are fired at the bottom of the reformer, and the process gas and flue gas flow co-currently from the bottom to the top of the reformer. In this type of reformer, the tube outlet is outside the furnace refractory wall/roof and exposed to the ambient.

Referring to the figures and commencing with FIG. 1, a bottom fired can reformer is depicted generally at 100, including reformer tubes 101 through which syngas exits the reformer at temperatures ranging from 1450-1650° F. Syngas flows upwards and exits the reformer tube through side port 102. Internal insulation (not shown) comprising of a cylindrically-shaped can and filled with insulation material such as ceramic fiber blanket, is positioned in the interior of tube outlet 101 and prevents the hot syngas from making direct contact with the flange and thereby overheating it. Generally, the flanges are made of carbon steel and it is necessary to keep its temperature below 400° F. In instances where the flanges are made of stainless steel, a higher temperature (up to 800° F.) is tolerable. External insulation 103 also limits heat losses from the tube outlet and prevents rapid cooling of the syngas. As noted above, the tube outlet is located outside the reformer 100 where, unless the insulation design prevents internal surfaces of the tube outlet and flanges from entering specific temperature ranges, it can be susceptible to material degradation mechanisms such as metal dusting, high temperature hydrogen attack and dew point condensation induced failures.

With reference to FIG. 2a, the external insulation 206a is typically one inch thick and extends a few inches above the outlet port 207a. The internal insulation can 208a is typically cylindrically-shaped. As determined through failure root cause analysis and Computational Fluid Dynamics (CFD) modeling, the effect of this insulation arrangement was found to be lacking. The modeling results in FIG. 5a depict that this insulation scheme is insufficient and will lead to rapid failure of the tube outlet because areas of the tube metal below the distal end of the insulation can and in the vicinity of the outlet port 207a are in the temperature range of 900-1400° F., which are favorable to high rates of metal dusting corrosion in syngas environments. The term "metal dusting or metal dusting corrosion" as utilized herein will be understood by those skilled in the art to mean a form of carburization that leads to material loss, occurring in high carbon activity environments between 570° F.-1550° F., with maximum rates happening typically between 900-1400° F. but highly dependent on the process conditions.

The very short height of the external insulation leads to increased heat losses and low flange temperatures. In this example, the maximum temperature on the weld flange was found to be ~237° F. While this is beneficial to minimizing the occurrence of high temperature hydrogen attack, metal temperatures for the upper parts of the tube outlet are below the syngas dew point temperature, which is ~311° F. in this case. As a result, water will condense on the inner walls of the tube. At a lower location where the tube is hotter, the water evaporates. This repeated condensation/evaporation cycle can cause thermal fatiguing and cracking of the reformer tube. In other cases too, the condensed water can become slightly acidic due to dissolved gases such as $CO_2$, and can cause corrosion of the tube. These material degradation mechanisms are herein referred to as dew point condensation related failures. The term "high temperature hydrogen attack" as utilized herein will be understood by those skilled in the art to mean a form of decarburization at elevated temperatures (typically >400° F. for carbon steel) whereby hydrogen can dissociate into atomic form and diffuse into steel, reacting with unstable carbides to form methane gas. This eventually leads to cracking and equipment failure.

FIG. 2b illustrates another embodiment of the related art in which the thickness and height of the external insulation 206b have been increased. The internal insulation can 208b is cylindrically-shaped. As can be seen in CFD results of FIG. 5b, this reduces heat losses and shifts the areas of the tube outlet with temperatures favorable to metal dusting further up. While this is an improvement over the previous design in that the flanges temperatures are higher (maximum is 330° F.), there are still tube metal areas below the distal end of the insulation can that fall in the metal dusting favorable temperature band. Increasing the annular gap size to increase convective flow of hot syngas in that region to further shift up the metal dusting favorable temperature band invariably exposes the flanges to more hot syngas and can cause overheating. Therefore there is a need for an insulation design that balances these opposing temperature constraints and leads to a desired tube metal temperature profile.

Referring now to an exemplary embodiment of the invention, as shown in FIGS. 3(a), 3(b) and 3(c), the tube outlet assembly 300a-c is utilized in the steam reformer 100 shown in FIG. 1, and replaces the conventional tube assembly of FIG. 2a or 2b.

An internal insulation can of the tube outlet assembly 300a-c includes a blind flange 311a-c and a non-cylindrical can 308a-c that is positioned in the interior space of the steam reformer tube 305a-c. The can portion 308a-c fits into the inside of the reformer tube and is securely attached to the blind flange 311a-c such as through a weld. Internal insulation can 308a-c is a sheet metal formed into the non-cylindrical can and filled with insulation material and extends toward the outlet port 307a-c at its distal end.

In an assembled form of the tube assembly 300a-c as shown, the internal insulation can 308a-c is tapered or stepped as shown in FIG. 3(a)-3(c) toward the distal end extending into the tube 305a-c. The tapering or stepping can be partial—up to any length of the can, such as all the way to the blind flange as shown in FIG. 3(a), or halfway—as shown in FIG. 3(b). The extent of the taper dictates the amount of hot syngas that circulates in the annular gap towards the flange, allowing a larger volume of hot syngas to be maintained at the entrance of the gap so that the tube metal temperature up to the distal end of the can is above the high rates metal dusting temperatures, yet limiting the flow of hot gas towards the flange. Preferably, the gap between the insulation can and the reformer tube inside diameter ranges between about 0.25 and 1 inches at the distal end, and between 0.1 to 0.25 inches at the blind flange end. This ensures that the section of tube outlet between the distal end of the can and tube/flange weld neck 312a-c can be maintained above the syngas dew point temperature to avoid dew point condensation induced failures, but with the flange kept at low enough temperatures (e.g., below 400° F. for carbon steel flanges) to prevent the occurrence of high temperature hydrogen attack. FIG. 3(c) shows an embodiment where the internal can is stepped. The effect of the stepped can with a larger gap at the distal end than at the blind flange end is analogous to the tapering shown in FIG. 3(a), but may be easier to fabricate. A partially stepped can analogous to FIG. 3(b) can also be employed.

As illustrated in FIGS. 4(a) and 4(b), other exemplary embodiments are shown where the tube outlet assembly has a tapered can which is angled (413a) or curved (413b) at the distal end, with the longer side being located opposite the syngas outlet port 407(a-b). This arrangement allows the non-outlet side of the tube outlet to always remain above metal dusting favorable temperatures. The angled or curved end of the insulation can at the distal end also acts to direct hot gas towards the opposite side of the tube, ensuring that that side stays above metal dusting favorable temperatures. This way, sections of tube outlet with temperatures favorable to metal dusting are shifted to low syngas flow areas downstream of the bottom of the internal insulation can where the rate of metal dusting corrosion is greatly diminished. This embodiment is suitable in situations where the temperature of the process gas entering the tube outlet is relatively low at around ~1500° F.

The choice of internal can design for the tube assembly outlet will depend on the process conditions and geographic location of the reformer. For processes where the temperature of the syngas exiting the reformer is very high (>1600° F.), a shallow taper or stepping will be most appropriate as it is not desirable to have large volumes of very hot syngas contact the flanges. Conversely, if the reformer is located in a very cold climate, then a more pronounced tapering or stepping will be appropriate as more syngas can be directed into the gap to help maintain temperatures above the dew point. By considering the process conditions and climate, an appropriate internal and external insulation tube outlet assembly design can be selected that greatly improves its reliability and lifespan.

The invention is further explained through the following examples, which compare the base case with a standard design at the outlet tube, and those based on various embodiments of the invention, which are not to be construed as limiting the present invention.

Comparative Example

FIG. 5(a) depicts the CFD modeling results for the related art flanged tube outlet assembly design shown in FIG. 2(a). In this design, the external insulation is 1 inch thick and 3.5 inches above the centerline of the outlet port. The internal insulation can is cylindrically shaped. As the syngas exits the furnace and enters the tube outlet assembly, it proceeds from being heated in the radiant section to losing heat to the ambient in the tube outlet. In the tube outlet assembly design shown, inadequate external insulation and a conventional internal can design leads to heat losses and the tube metal temperatures below the distal end of the internal can fall in the temperature range favorable to high rates of metal dusting, 900-1400° F., as shown in FIG. 5a. In this design, the maximum flange temperature shown is ~237° F. This is beneficial for avoiding high flange temperatures. On the other hand, the temperatures on the top part of the tube are below the syngas dew point, which is 311° F. in this case. As a result, the tube outlet will be prone to dew point condensation related failures.

In an alternative example of the related art, and as shown in FIG. 2(b), the thickness and height of the external insulation have been increased but the internal insulation can 208b is still cylindrically-shaped. As can be seen in CFD results exhibited in FIG. 5(b), it reduces heat losses and the maximum flange temperature is 330° F. This shifts the areas of the tube outlet with temperatures favorable to metal dusting further up, but there are still tube metal areas below the distal end of the insulation can that fall in the metal dusting favorable temperature range. Increasing the annular gap size will increase convective flow of hot syngas in that region and likely lead to higher than desired flange temperatures.

Example 1

The design which is the subject of this invention involves an internal insulation can that is tapered where the annular gap is larger at the distal end than at the blind flange end (FIG. 6). In this example, the gaps at the distal end and blind flange ends are 0.25 and 0.1 inches, respectively. By this design, a larger volume of hot syngas initially enters the gap. This helps shift the areas of the tube with temperatures favorable to metal dusting to above the distal end of the insulation can where because of very little flow of syngas, metal dusting corrosion rates are greatly decreased. However, because the gap narrows towards the blind flange, decreased amounts of hot gas makes contact with the flange thereby keeping it cooler to avoid overheating it, but maintaining it above the syngas dew point temperature to avoid dew point condensation induced failures. Plots of the circumferentially averaged inner wall tube temperature for the prior art and FIG. 6 are shown in FIG. 8. As can be seen, all areas below the distal end of the can are above the upper temperature limit for high rates of metal dusting (~1400° F.), whereas tube temperatures for both cases of the related art shows susceptibility to metal dusting in those areas. This susceptibility is more pronounced for the configuration of FIG. 5a. The maximum flange temperature is also higher (i.e., 341° F. for the FIG. 6 design), reducing susceptibility to dew point condensation induced failures.

Example 2

The results shown in FIG. 7 depict another embodiment of the present invention. In this case, the external insulation is the same as in FIGS. 5b and 6 (2.75" thick and extends to 2" below the weld neck) but the internal can is tapered and its distal end is angled. Since the angled end is longer, areas of the tube metal opposite the outlet side of the tube outlet always remain above metal dusting favorable temperatures. The angled or curved end of the insulation can also acts to direct hot gas towards the opposite side of the tube, ensuring that that side also stays above metal dusting favorable temperatures. This way, sections of tube outlet with temperatures favorable to metal dusting are shifted to low syngas flow areas above the bottom of the internal insulation can where the rate of metal dusting corrosion is greatly diminished. Referring to FIG. 8 again, the circumferentially averaged inner wall tube temperature for FIG. 7 is also shown. As can be seen, the internal can design of this invention leads to all areas below the bottom of the can to be well above the upper threshold (~1400° F.) for high rates metal dusting corrosion. Furthermore, the maximum flange temperature for the FIG. 7 design is 391° F., allowing the entire length of the tube outlet to be maintained above the syngas dew point temperature to stop thermal cycling fatigue, but minimizing the flange temperatures to help eliminate occurrence of high temperature hydrogen attack on the flanges.

Although various embodiments have been shown and described, the present disclosure is not so limited and will be understood to include all such modifications and variations as would be apparent to one skilled in the art.

We claim:

1. A flanged tube outlet assembly of a steam methane reformer assembly comprising:
at least one or more reformer tubes having an inlet for allowing a process gas to be introduced into a tube outlet assembly for the removal of said process gas, wherein a process gas exiting an outlet port is syngas, said tube outlet assembly is disposed outside of the steam methane reformer and includes a reformer tube having an interior space accommodating an internal insulation can therein wherein said insulation can is fitted in the interior space of the reformer tube, and the exterior of said reformer tube is covered with insulation extending in close proximity to a tube-flange weld neck;
an outlet port disposed upstream of a distal end of said insulating can for delivering said syngas to downstream process units, and
said insulation can is connected to a blind flange and extends into the reformer tube toward the outlet port, wherein a gap between the can and the interior of said reformer tube is larger at the distal end than at a blind flange end.

2. The flanged tube outlet assembly of claim 1, wherein the internal insulation can is selected from the group consisting of a fully tapered can, a partially tapered can, a fully stepped can or a partially stepped can.

3. The flanged tube outlet assembly of claim 2, wherein the internal can has an angled or curved distal end.

4. The flanged tube outlet assembly of claim 1, wherein the insulation can disposed in the interior of said reformer tube is designed to maintain areas of the tube outlet upstream of the distal end of the insulation can above the temperature range favorable to metal dusting, while areas with temperatures favorable to high rates of metal dusting are restricted to regions of low syngas flow within the annular gap thereby having a reduced rate of metal dusting corrosion.

5. The flanged tube outlet assembly of claim 1, wherein the larger gap size at the distal end of the insulation can maintains the tube outlet above the syngas dew point temperature, and the reduced gap size toward the blind flange keeps the flanges below the threshold temperature for high temperature hydrogen attack.

6. The flanged tube outlet assembly of claim 2, wherein the gap of the tapered or stepped insulation can at the distal end ranges between about 0.15 to 1 inches, and the gap at the blind flange end ranges between about 0.1 to 0.5 inches.

7. A flanged tube outlet assembly of a steam methane reformer assembly comprising:
  at least one or more reformer tubes having an inlet for allowing a process gas to be introduced into a tube outlet assembly for removal of the process gas, wherein said process exiting an outlet port is syngas,
  said tube outlet assembly is disposed outside a steam methane reformer and includes a reformer tube having an interior space accommodating an internal insulation can therein wherein said insulation can is tapered or stepped in the interior space of the reformer tube and wherein the exterior of said reformer tube is covered with insulation extending in close proximity to a tube-flange weld neck;
  the outlet port is disposed upstream of a distal end of said insulation can for delivering said syngas to downstream process units, and
  said insulation can is connected to a blind flange and extends into the reformer tube toward the outlet port and securely connected to the blind flange, wherein a gap between the can and the interior of said reformer tube is in the range between about 0.1 to 0.5 inches at a blind flange end of said tube outlet, and 0.1 to 1 inches at the distal end, allowing a larger volume of hot syngas to be maintained at the distal end of the gap so a tube metal temperature in the vicinity of the distal end of the can is above metal dusting favorable temperatures, yet regulating a flow of hot gas towards a flange to maintain the whole length of a tube outlet above the syngas dew point temperatures to eliminate condensation/evaporation thermal cycling induced fatigue cracking while lowering the flange temperatures to minimize occurrence over-temperature induced metal failures.

8. The flanged tube outlet assembly of a steam methane reformer of claim 7, wherein the internal can is either partially or fully tapered or stepped, and optionally with the distal end angled or curved.

9. The flanged tube outlet assembly of claim 7, wherein the internal insulation can is selected from the group consisting of a fully tapered can, a partially tapered can, a fully stepped can or a partially stepped can.

10. The flanged tube outlet assembly of claim 7, wherein the internal can has an angled or curved distal end.

* * * * *